United States Patent Office 3,495,280
Patented Feb. 17, 1970

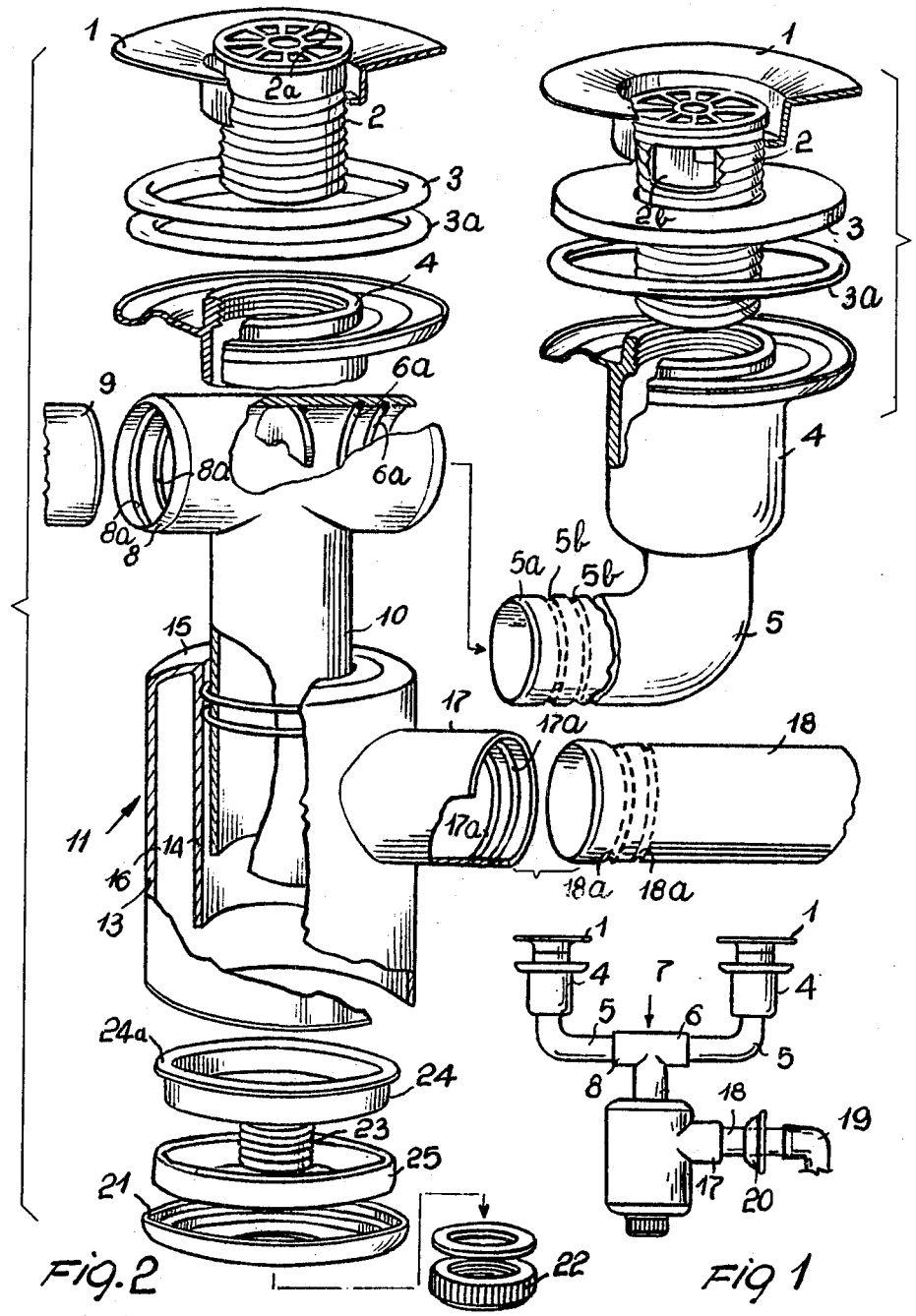

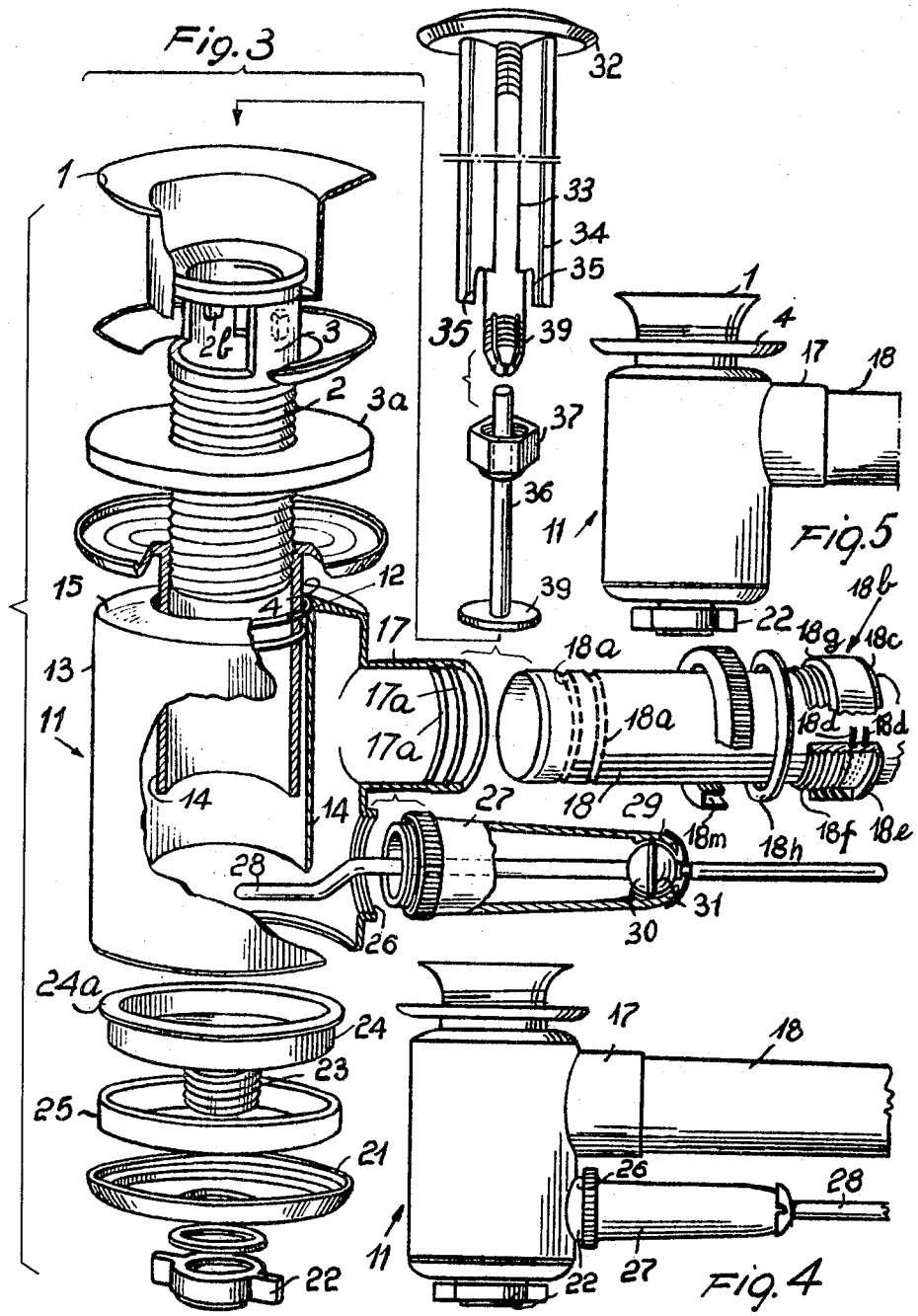

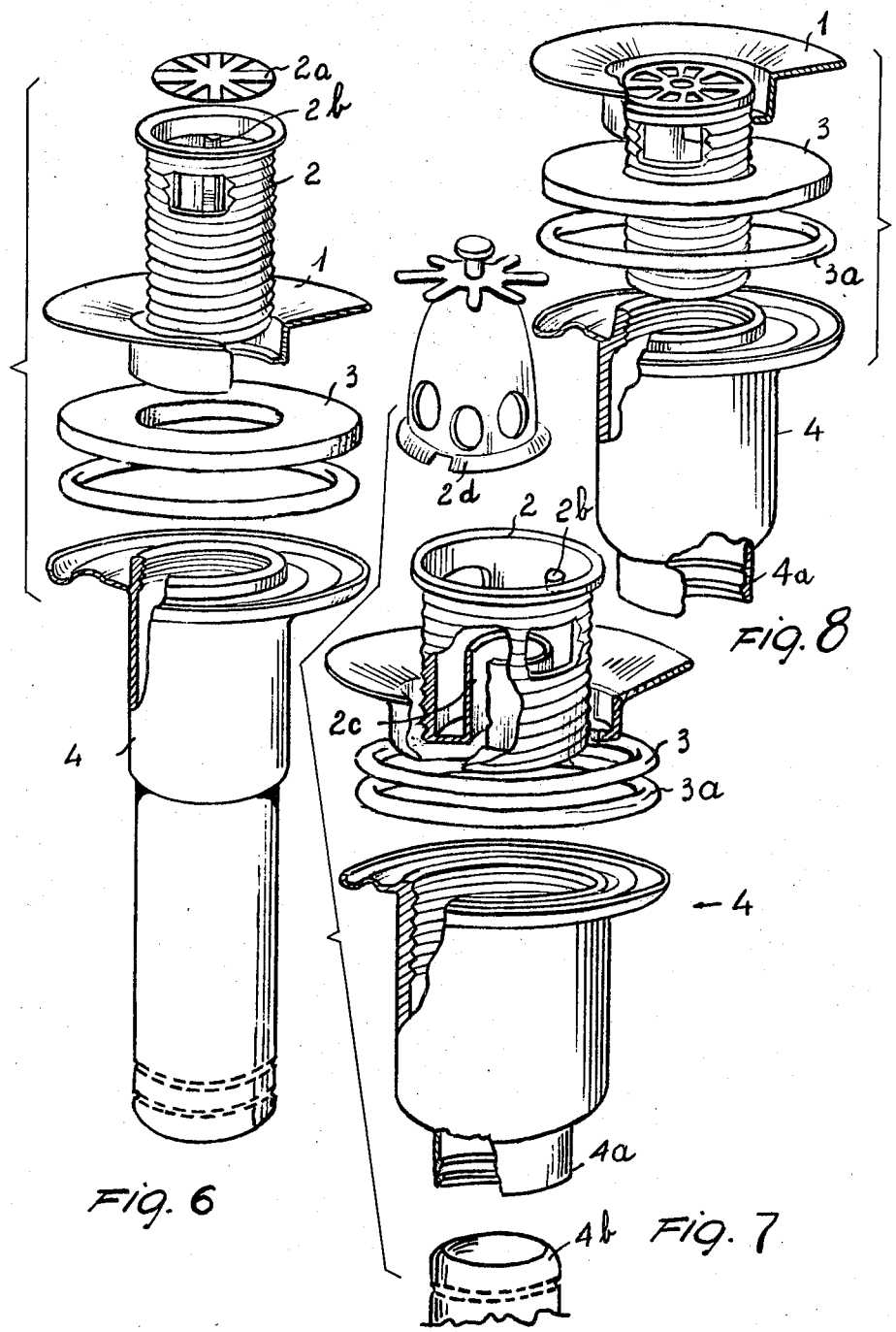

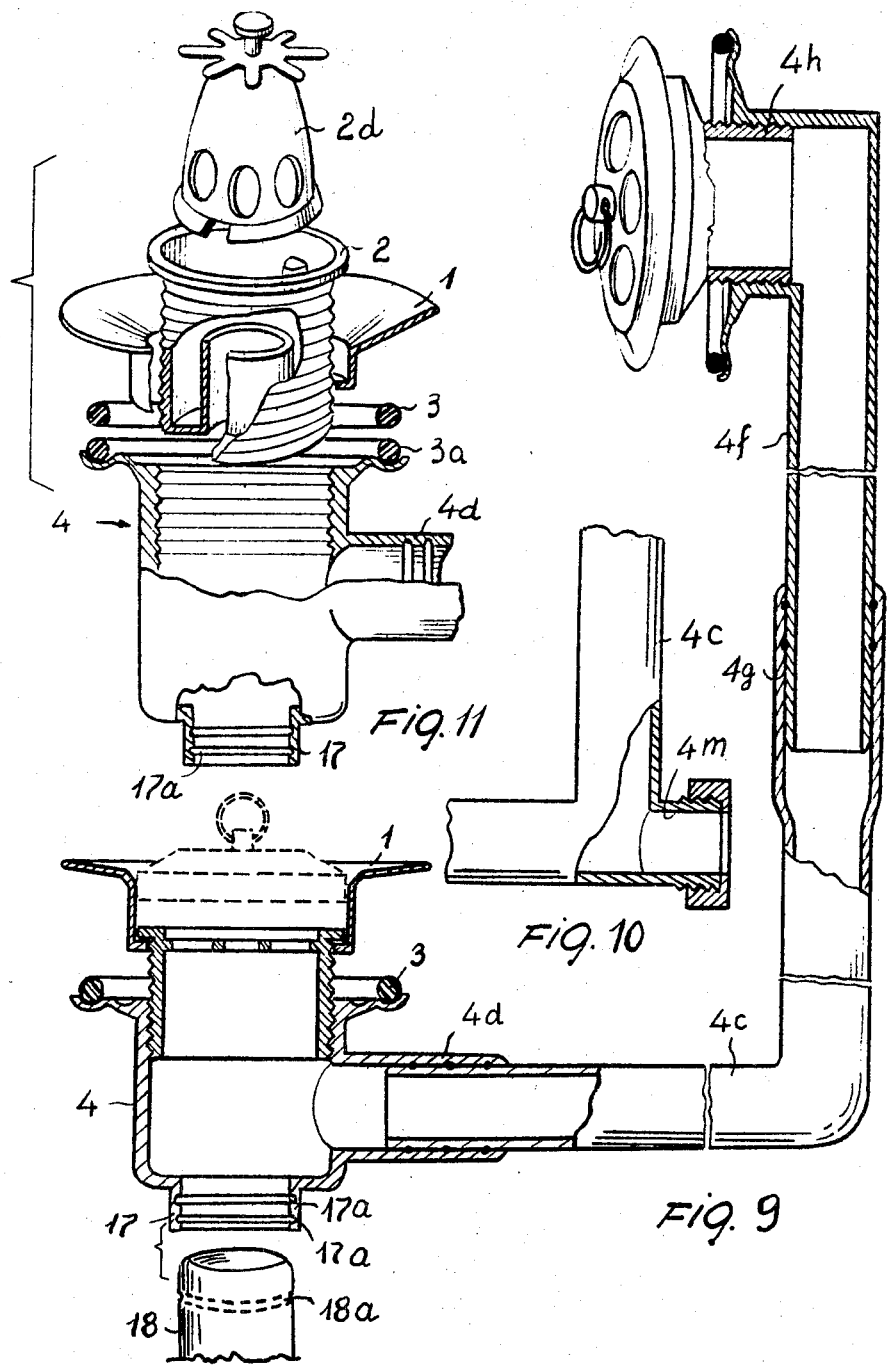

3,495,280
TELESCOPIC PIPE-FITTING STRUCTURE
Giuseppe Galbiati, Piazza Aspromonte 17, Milan, Italy
Filed Nov. 21, 1966, Ser. No. 595,969
Claims priority, application Italy, Mar. 2, 1966,
15,095/66; Apr. 29, 1966, 17,337/66
Int. Cl. E03c 1/22; F16l 17/02
U.S. Cl. 4—203         3 Claims

ABSTRACT OF THE DISCLOSURE

Telescopic pipe-fitting structure for sanitary apparatuses comprising at least two tubular elements having different diameters, whereof the tubular element with the smaller diameter is telescopically insertable into the greater diameter tubular element, annular grooves being provided in the inner periphery of the greater diameter tubular element for receiving sealing and supporting ring gaskets of elastic material.

---

This invention relates to a telescopic pipe-fitting structure particularly for use in any type of sanitary apparatus particularly in association with a trap body member and pipe fittings in general.

In the known art of draining liquids from sanitary apparatuses, with one or more basins, having drain outlets terminating in a single trap, there is involved the solution of various problems.

It is known for example that there are different types of traps applicable to various sanitary articles. Generally, these types are not interchangeable with one another, and while being advantageous from some points of view, are not free from drawbacks, such as the fact that the seals obtained by two gaskets distributed on the threading do not ensure after some time an effective seal, whereby water leaks will occur within the joining sections.

Another drawback is that cleaning inside of the traps is difficult and suitable tools are essential in order to release the obstructed bottom of the trap and re-assemble it without preventing possible leakages within the joining section.

Another drawback is due to the fact that in known traps it is necessary to apply traps of a different shape and dimensions for each sanitary article or the like.

Furthermore the installation of the waste pipes for the sanitary apparatuses can be conveniently carried out only if a suitable equipment is available and by use of properly trained staff. It is known, indeed, that in the wall chase works of the pipings within building wall structures, fairly substantial tolerances are granted as to the location for the inlet and outlet openings of the pipings on the wall structures. Therefore, the installation of sanitary apparatus waste pipes provided outside the wall structures for connection to the openings of the pipes embedded within said wall structures frequently requires the bending of such waste pipes and, in addition, the use of clamping pipe unions in order to ensure the required liquid-tight connections.

It is an object of this invention to devise a pipe-fitting structure overcoming the abovementioned drawbacks, that is to say a pipe-fitting structure of simple installation and ready application so as to be installed even by people not particularly trained and without using any special outfit.

It is another object of this invention that said pipe-fitting structure be of a very simple general use, and have a low manufacturing cost.

It is another object of this invention to provide a pipe-fitting structure avoiding the necessity for using fastening pipe unions between the various pipe sections and thus eliminating all threading on the members to be connected.

A still further object of this invention is to provide such a pipe-fitting structure as to assure an accurate watertight joint, while being by request readily adaptable to all types of sanitary apparatuses.

Another object of this invention is to devise a trap structure provided with the pipe-fitting according to the invention, which may be fitted to wash-basins, bidets, and sinks, the latter having one or two basins.

Another object is that said trap structure may be mounted on various sanitary articles or piping without using any particular tool and in a simple and rapid manner.

Still another object is to provide a ready disassembling of the various parts making up a trap structure which permits the internal cleaning thereof.

These and other objects, which hereinafter will be more apparent hereinbelow, are attained by a telescopic pipe-fitting structure for use in any type of sanitary apparatus, comprising in combination a first pipe section, a second pipe section having an outer dimeter substantially equal to the inner diameter of said first pipe section, at least an annular groove formed in said pipe sections generally at one end thereof, an annular gasket means in the said groove for the watertight coupling, said second pipe section being adapted to slidably and partially enter said first pipe section, and pipe-fittings means connected to said first and second pipe section at the free ends thereof.

Further features and advantages of the invention will become more apparent from the following detailed description given by way of example and not of restriction, reference being made to the accompanying drawings, in which:

FIG. 1 is a perspective view of the telescopic pipe-fitting structure according to the invention in an assembled condition and associated with a trap structure with two inlet ducts.

FIG. 2 is an exploded perspective view of the pipe-fitting structure in FIG. 1, with portions thereof being partially broken and cut away;

FIG. 3 is an exploded view of the various component members of another trap structure provided with the telescopic pipe-fitting according to the invention;

FIG. 4 is a perspective view of the trap in FIG. 3 with the various members thereof in an assembled condition;

FIG. 5 is a view of a further embodiment of the trap provided with the telescopic structure according to the invention;

FIG. 6 is an exploded perspective view of a further telescopic pipe-fitting structure;

FIG. 7 is an exploded perspective and fragmentary sectional view of a further embodiment of a trap structure provided with the telescopic pipe-fitting structure of the invention;

FIG. 8 is a view similar to FIG. 7, showing a simple drain element;

FIG. 9 shows the simple drain of FIG. 5 laterally provided with an opening telescopically connected by the pipe-fitting structure of the invention with a section of overflow pipe for sanitary apparatuses;

FIG. 10 shows an overflow pipe formed of telescopically connected sections and having an outlet port at the lower curve, and FIG. 11 shows the trap structure of FIG. 7 provided with a telescopic structure of the invention for the connection to an overflow pipe for sanitary apparatuses.

In the above figures the like parts are designated by the same reference numbers. Referring to FIGS. 1 and 2, at 1 there is indicated a flanged collar element for sealing engagement with the inner bottom of a sanitary apparatus.

The element 1 is axially movable and capable of slight tilts relative to the axis of an externally threaded tubular element 2, having at the top thereof the filter grate member 2a integral with the element 2. Between the collar 1 and flanged drain tubular element 4 two properly shaped gaskets 3 and 3a are provided, adapted to inhibit possible water seepage or leaks between said collar 1 and the walls of a sanitary apparatus (not shown).

The externally threaded tubular element 2 may have an overflow opening 2b for water overflow in the sanitary apparatus, not shown (see FIG. 2).

Element 2 is designed to be screwed into a flanged drain tubular element 4, which is connected, for example, with a round elbow 5, the end 5a of which is connected by insertion into the end 6 of a T-shaped adapter pipe element 7. As seen in FIG. 1, the end 8 of the element 7 receives the end of a joining pipe 9, completely similar to elbow 5.

The telescopic connection between the elbow 5 and end 6 of the element 7 (and therefore between the latter and the end 9) occurs by insertion of the end 5a of pipe 5, which is of a less diameter than end 6, into the T-shaped adapter pipe element 7. In order that sealing be assured, inside of sections 6 and 8 there are formed two slits or grooves for accommodating two suitable toroidal gaskets 6a and 8a, respectively.

If desired, said gaskets may be provided on the ends 5a and 9a, the same being then received in respective outer annular seatings such as 5b, as shown in dotted lines in FIG. 1.

The adapter element 7 is telescopically inserted at its vertical section 10 into a trap structure 11, gaskets 12 being provided between section 10 and structure 11 in order to prevent possible water leaks from the trap to the outside. The trap structure 11 consists of two co-axial tubular members 13 and 14 with a common portion 15 at the upper end thereof, so as to define therebetween an annular gap 16. The length of member 14 is, of course, less than that of member 13, while the bottom of said trap is removably mounted on said member 13, as it will be explained hereinafter.

On the outer wall 13 of trap 11 there is provided a discharge outlet element or tubular connection member 17 projecting therefrom. Two annular grooves 17a are formed at the free end of such outlet element 17, which are adapted to receive two toroidal gaskets made of a rubber material or the like.

A tubular connection member or pipe section 18 having an outer diameter substantially equal to the inner diameter of element or member 17 is further provided to telescopically engage with said fitting member or element 17, the watertightness between the outlet element 17 and member 18 being assured by the gaskets provided in the grooves 17a.

Alternatively grooves 18e could be formed in the outer surface of member 18, if desired, instead of grooves 17a, as shown in FIG. 2.

The tubular pipe section 18 is furthermore telescopically connected (FIG. 1) to the elbow 19 to which the waste pipe proper terminates. On the section or member 18 there is slidably mounted an annular cap member 20 adapted to cover the elbow 19.

The trap 11 includes at the bottom thereof a cup-like plate 21 engaging by means of a nut 22 with the threaded stem member 23 of a cover element 24. The latter has a flange 24a which forms an abutment for a resiliently expanding gasket 25.

Reference is made now to FIGS. 3–5, where further embodiments of the pipe-fitting structure according to the invention are illustrated in connection with different types of trap structures. More particularly in FIG. 3 a telescopic trap is shown wherein the flanged drain tubular element 4 telescopically engages directly with the tubular member 14 of the trap.

Furthermore below the discharge element 17 a threaded opening 26 is provided in the member 13 of the trap, which is adapted to receive a sleeve 27. Through the sleeve 27 a rod 28 is located, which enters the trap 11 so as to substantially reach the central zone thereof between the tubular member 14 and the cover 24. In order to prevent water seepage at the end remote from the trap the sleeve 27 has a seat 29, wherein a sphere 30 is provided. Said sphere 30 supports the rod 28 and allows the same to be oscillated around the center thereof.

At 32 a plug element is indicated which comprises an elongated body member 33 provided with a number of fins 34. The latter define a number of seats 35 for use in connection with a component member which will be illustrated hereinafter. A shank 36 may be connected to the body member 33 and secured thereto by means of an adapter 37 at one and thereof and thread 38. Its other end has a head 39 adapted to rest on the rod 28, once the plug element 32 is inserted into the element 2.

Acting then on lever means, not shown, connected to the rod 28 outside the sleeve 27, the plug member 32 may be raised or lowered, as desired, thus permitting the sanitary apparatus be discharged or watertight plugged, respectively.

When use of plug 32 is not contemplated, the opening 26 may be closed by applying thereto a fixed plug (not shown).

FIG 5 illustrates a telescopic pipe-fitting structure for a trap structure where the use of the plug element 32 is not provided.

With further reference to FIG. 3 on the section 18 there is provided a connector member 18b for the attachment of the section 18 to the waste piping (not shown). Such member comprises a ring element 18c, provided with inner toroidal gaskets 18d, a flanged end 18e and an outer thread 18f; and annular expansion gaskets 18g on said ring element 18c, a washer 18h and a pipe union member 18m.

Referring now to FIGS. 6 and 8, at 4 there is indicated a drain element designed to be telescopically connected at the end 4a with the trap element 11 of FIGS. 3 and 4 per example. Moreover, the filter grate 2a may be removed from element 2 to allow the screwing of the latter into the drain 40 by drawing through lugs 2b provided internally said element 2. (FIG. 6).

FIG. 7 shows a trap-like drain 4 designed, as shown in the figure, to be telescopically connected, to an elbow 4b, and having its threaded element 2 internally provided with the co-axial pipe 2c, provided a trap effect in co-operation with the bell element 2d. Obviously, when a trap-like drain as in FIG. 7 is used, the use of trap 11 will not be contemplated.

FIG. 8 shows a drain element 4 similar to that shown in FIG. 2, but designed to be telescopically connected to the curved elbow 5 rather than by welding.

In FIG. 9 there is shown the drain element of FIG. 8 provided with a side inlet conduit 4d telescopically connecting with a curved pipe 4c which in turn is telescopically and watertight connected at 4g with the tubular element 4f derivating from the drain discharge pipe union 4h.

In FIG. 10 there is shown the same pipe combination of FIG. 9 for the overflow discharge of bath tubs and the like, wherein a port 4m is provided at the lower curve 4c.

FIG 11 shows the same pipe combination of FIG. 9 being, however, associated to a trap-like drain as from FIG. 7.

It should be noted that the above described pipe-fitting structure may be mounted with considerable ease and rapidity without the use of any special tool. The element 2 in fact, which is the only component part to be threaded may be readily screwed down by the plug member 32 (FIG. 3), the fins 34 of which engage with the lugs 2b. In case a filter grate 2a is provided integral with the element 2, the plug 32 will be used as an outside tool. The seats 35 will thus engage with a corresponding number of radial members of the filter grate 2a, thus making it possible to screw down the tubular element 2 into the flanged element 4 when rotating the plug member 32 from the outside.

Many structural changes and modifications may be made in the pipe-fitting structure of the present invention by those skilled in the art, especially as far as its application to pipe-fittings in general, without departing from the protective scope as defined by the following claims. The materials being used as well as sizes may be whichever according to requirements.

What I claim is:

1. Telescopic pipe-fitting structure for sanitary apparatuses, which include a first fitting member having at least one tubular connection portion with a greater diameter and a second fitting member having another tubular connection portion with a smaller diameter, the inner periphery of said one connection portion matching substantially the outer periphery of said other tubular connection portion and having external annular grooves and sealing ring gaskets in said grooves, wherein according to the improvement said inner periphery of said one connection portion has at least two axially spaced external annular grooves with annular gaskets received therein and said outer periphery of said other tubular connection portion is smooth thereby to allow a telescopic coupling of said one and said other tubular connection portions and to allow said axially spaced annular gaskets to exert a sealing and supporting action on said connection portions.

2. A structure according to claim 1, wherein said second fitting member or pipe section (18) has two coaxial tubular connection portions at opposite ends thereof, the structure comprising further another first fitting member (19) telescopically connected with the connection portion end of said second fitting member (18) remote from said first fitting member or discharge outlet element (17), said first and said other first fitting members (17, 19) being arranged at a distance from one another and said second fitting member (18) having a length and the stroke of the telescopic coupling motion so selected that in at least one position of the stroke said second fitting member (18) is shiftable with respect to said first fitting members.

3. A structure according to claim 1, wherein said first fitting member is a trap structure connecting with a discharge opening of a sanitary unit including a plug member for said discharge opening and control lever means for said plug member, said trap structure having a waste outlet connection and a trap portion below said waste outlet connection, and wherein according to the improvement in said trap portion below said waste outlet connection, said trap structure has an opening for said control lever means actuating said plug member.

References Cited

UNITED STATES PATENTS

| | | | |
|---|---|---|---|
| 903,569 | 11/1908 | Heeney | 4—197 |
| 917,395 | 4/1909 | Wise | 4—198 X |
| 2,302,617 | 11/1942 | Little | 285—122 |
| 2,896,977 | 7/1959 | Hansen | 285—351 X |
| 3,001,804 | 9/1961 | Tomlinson et al. | 285—351 X |
| 3,367,681 | 2/1968 | Braukman | 285—351 X |

FOREIGN PATENTS 1,213,686  11/1959  France.

LAVERNE D. GEIGER, Primary Examiner

HENRY K. ARTIS, Assistant Examiner

U.S. Cl. X.R.

285—351